(12) United States Patent
Yamade

(10) Patent No.: US 7,647,377 B2
(45) Date of Patent: Jan. 12, 2010

(54) DATA TRANSMISSION DEVICE, METHOD AND PROGRAM FOR PROVIDING A UNIFIED TRANSMISSION METHOD IN MULTI-DESTINATION DELIVERY

(75) Inventor: Yasushi Yamade, Osaka (JP)

(73) Assignee: Minolta Co., Ltd., Osaka (JP)

( * ) Notice: Subject to any disclaimer, the term of this patent is extended or adjusted under 35 U.S.C. 154(b) by 1731 days.

(21) Appl. No.: 10/073,150

(22) Filed: Feb. 13, 2002

(65) Prior Publication Data

US 2002/0131074 A1 Sep. 19, 2002

(30) Foreign Application Priority Data

Mar. 13, 2001 (JP) .............................. 2001-070883

(51) Int. Cl.
*G06F 15/16* (2006.01)
(52) U.S. Cl. .................. 709/206; 709/217; 709/232
(58) Field of Classification Search .......... 709/204–207
See application file for complete search history.

(56) References Cited

U.S. PATENT DOCUMENTS

| 5,903,723 | A | * | 5/1999 | Beck et al. ................. 709/200 |
| 6,529,956 | B1 | * | 3/2003 | Smith et al. ................. 709/229 |
| 6,687,741 | B1 | * | 2/2004 | Ramaley et al. ............. 709/206 |
| 6,775,688 | B1 | * | 8/2004 | Kakimoto ................... 709/203 |
| 6,823,365 | B1 | * | 11/2004 | Mattis et al. ............... 709/206 |

FOREIGN PATENT DOCUMENTS

| JP | 11-341048 | 12/1999 |
| JP | 11-345182 | 12/1999 |

\* cited by examiner

*Primary Examiner*—Aaron Strange
(74) *Attorney, Agent, or Firm*—Morrison & Foerster LLP

(57) ABSTRACT

A data transmission device, method and program capable of increasing work efficiency in data transmission during multi-destination delivery by unifying transmission method. According to the data transmission device, method and program, a user's instruction is received to designate for each destination one of a first transmission mode in which a file is sent attached to an e-mail message, a second transmission mode in which a file is sent to a file transfer server, and a third transmission mode in which a file is sent to a file transfer server and an e-mail message having a text string including address information of the file transfer server is sent, it is determined whether or not the destinations include those for which the first transmission mode is designated as well as those for which the second transmission mode is designated, and then the third transmission mode is set for the destinations for which the first transmission mode is designated in place of the first transmission mode when it is determined that the destinations include those for which the first transmission mode is designated as well as those for which the second transmission mode is designated.

11 Claims, 16 Drawing Sheets

DATA TRANSMISSION DEVICE, METHOD AND PROGRAM FOR PROVIDING A UNIFIED TRANSMISSION METHOD IN MULTI-DESTINATION DELIVERY

This application is based on Japanese Patent Application No. 2001-70883 filed in Japan on Mar. 13, 2001, the entire content of which is hereby incorporated by reference.

BACKGROUND OF THE INVENTION

1. Field of the Invention

This invention relates to a data transmission device, method and program.

2. Description of Related Art

It has been proposed in recent years to add to apparatuses having an image reading means, such as copying machines, image scanners and facsimiles, a function to transmit a file comprising image data, which is obtained through the reading of the image of an original document, by attaching such file to an e-mail message, as well as a function to send such file to an FTP (File Transfer Protocol) server.

However, because image data is generally large in size, the problems arise that where a file is simultaneously sent to multiple destinations, the file occupies a large portion of the network and it takes time for the device main unit to be released.

In particular, where a file is sent to destinations to which the file is sent as an attached file to an e-mail message and destinations for which FTP transmission is designated, the problems identified above become significant because multiple sets of processing must be performed.

OBJECTS AND SUMMARY

The object of the present invention is to provide an improved data transmission device, method and program that resolve the various problems identified above.

Another object of the present invention is to provide a data transmission device, method and program that can increase work efficiency in data transmission during multi-destination delivery.

The various objects stated above are attained through a data transmission device comprising the following: a transmitting means that has a first transmission mode in which a file is sent attached to an e-mail message; a second transmission mode in which a file is sent to a file transfer server; a third transmission mode in which a file is sent to a file transfer server and an e-mail message having a text string including the file transfer server address information is sent; and a setting means that, during multi-destination delivery in which multiple destinations are designated, where the destinations include those for which the first transmission mode is designated as well as those for which the second transmission mode is designated, sets the third transmission mode for the destinations for which the first transmission mode is designated in place of the first transmission mode.

The data transmission device described above may further include a data generating means that generates image data, and the file may comprise image data generated by the data generating means.

The data transmission device described above may further include an image reader that reads the image of an original document and outputs image data, and the file may comprise image data output by the image reader.

In the data transmission device described above, the file transfer server is an FTP server, and the address information may include the IP address of the FTP server and the name of the folder in which the file is to be stored.

In the data transmission device described above, the file transfer server has an access authority authentication function and the e-mail message text string in the third transmission mode may include the user ID and password for authentication purposes.

The above various objects are also attained through a data transmission method comprising the following steps or a program that causes a computer to execute processing comprising the following steps: a step of receiving an instruction to designate one of a first transmission mode in which a file is sent attached to an e-mail message, a second transmission mode in which a file is sent to a file transfer server and a third transmission mode in which a file is sent to a file transfer server and an e-mail message having a text string including the file transfer server address information is sent; a step of determining during multiple-destination delivery in which multiple destinations are designated whether or not the destinations include those for which the first transmission mode is designated as well as those for which the second transmission mode is designated; and a step of setting the third transmission mode for the destinations for which the first transmission mode is designated in place of the first transmission mode when the destinations include those for which the first transmission mode is designated as well as those for which the second transmission mode is designated.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiment of the present invention is described in detail below with reference to the drawings.

Figure 1:
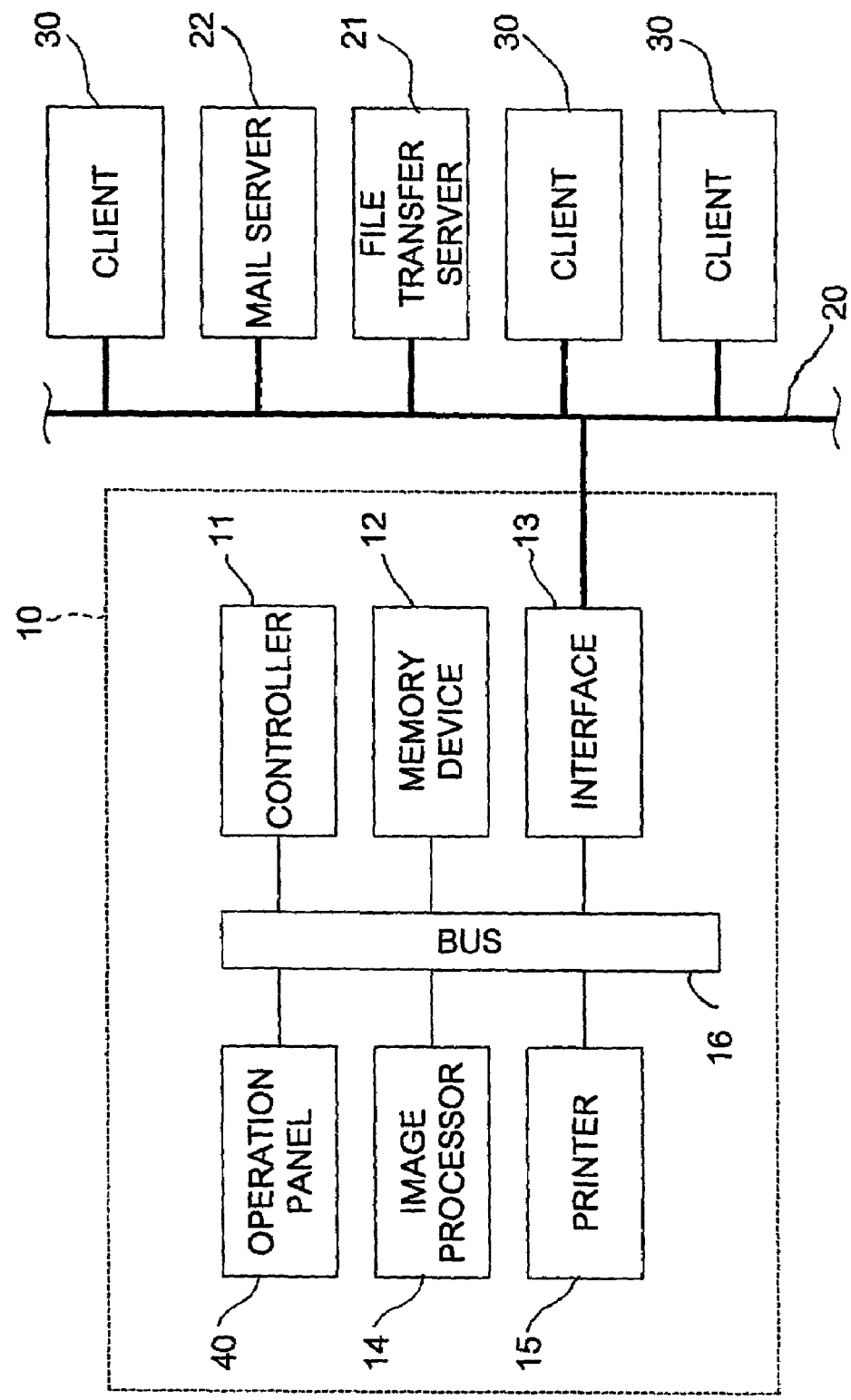
FIG. 1 is a block diagram of a data transmission device pertaining to one embodiment of the present invention.

The data transmission device 10 shown in FIG. 1 is a digital copying machine having a scanner mode in which image data obtained by reading the image of an original document is output as a file, and is connected to a network 20. A file transfer server 21, a mail server 22 and clients 30 are connected to the network 20.

The data transmission device 10 has a controller 11, a memory device 12, an interface 13, an image processor 14, a printer 15 and an operation panel 40, which are mutually connected through a bus 16.

The controller 11 is a central processing unit that controls the various components 12 through 15 and 40 in accordance with control programs, which include client programs to use the communication services of the file transfer server 21 and of the mail server 22 and a data transmission program.

The client program needed in order to use the communication services of the file transfer server 21 uses FTP, for example. The client program needed in order to use the communication services of the mail server 22 uses SMTP (Simple Mail Transfer Protocol), for example.

The data transmission program uses the client programs, and when destinations for which the first transmission mode, in which a file is sent attached to an e-mail message to the destination mail address, and destinations for which the second transmission mode, in which a file is sent to the file transfer server 21, coexist in multi-destination delivery, the data transmission device 10 is caused to execute data transmission using the third transmission mode with regard to the destinations for which the first transmission mode is designated.

The third transmission mode is a mode in which a file is sent to the file transfer server 21 and at the same time an e-mail message having text to which the address information regarding the file transfer server 21 is added is sent to the destination mail address. The e-mail message is, specifically, sent to the mail server 22 that corresponds to the domain name included in the destination mail address, and is stored in the mailbox for the user name (mail account) included in the destination mail address.

In other words, where the transmission method for multiple destinations is not unified as either the first transmission mode or the second transmission mode in multi-destination delivery, the transmission mode for the destinations for which the first transmission mode is designated is automatically changed to the third transmission mode. Consequently, the transmission method becomes unified, resulting in easier control and reduced data processing time.

In addition, because a file is not attached to the e-mail message, the network occupation rate due to the sending of the e-mail and the burden on the mail server caused by the receiving of the e-mail may be reduced. In particular, where the mail server receives multiple e-mail messages, the problem that the same attached file is stored in multiplication is avoided, rendering the above effect further marked.

Therefore, because the data processing time may be shortened and the network occupation rate may be reduced, the device main unit may be released in a short period of time. In other words, work efficiency during data transmission may be improved.

The memory device 12 comprises, for example, a read-only memory device such as a ROM, a high-speed random access memory device such as a RAM or a large-capacity random access memory device such as a hard disk drive. It stores the programs together with image data that is obtained when the image of an original document is read, as well as various parameter data, and is temporarily used as a workspace for the execution of the programs.

The interface 13 comprises a network interface card (NIC), and is used for the transmission and receipt of data over the network 20.

The image processor 14 has an image reading unit and a data processing unit.

The image reading unit comprises, for example, a scanner that includes a CCD (Charge Coupled Device) image sensor to read the images of the original document and generate image data, and an automatic document feeder (ADF) to read the original document images on a continuous basis. The image reading unit has multiple applicable resolutions, so that the user of the data transmission device 10, i.e., the sending user, may set the resolution each time an original document image is read.

The data processing unit carries out format conversion in which the image data format is converted into a data transmission format. The format conversion parameters include compression methods and document formats, and the sending user may designated the desired method and format.

The available compression methods include, for example, the MH (Modified Huffman) method, the MR (Modified Read) method, and the MMR (Modified Modified Read) method.

The available document formats include, for example, the TIFF (Tagged Image File Format), which is the file format for images, and the PDF (Portable Document Format), which is the file format for document display.

The printer 15 comprises, for example, an electrophotographic image forming apparatus, and outputs image data on sheets of paper.

The operation panel 40 has multiple keys, a liquid crystal display screen, and a touch panel that is placed on the liquid crystal display screen, and is used to input various parameter values for the data transmission device 10 and to display various messages.

The file transfer server 21 is a computer in which the server program to provide the communication services to transfer files is installed, and uses FTP, for example. The file transfer server 21 has an access authority authentication function in order to avoid unauthorized access by third parties other than the destination users. In other words, in order to use the file transfer server 21, a user ID and a password are required. A received file is stored in a prescribed folder.

The mail server 22 is a computer in which the server program to provide the communication services to send and receive e-mail is installed, and uses SMTP or POP (Post Office Protocol), for example.

The clients 30 are computers used by destination users, and comprise FTP clients and POP clients. That is, in each client 30 is installed the client program required in order to use the communication services offered by the file transfer server 21 and the mail server 22.

Namely, a destination user uses the client 30 to download a file stored in a prescribed folder of the file transfer server 21 and to extract an e-mail message with an attached file, which is stored in a prescribed mailbox of the mail server 22. Where the e-mail message contains, instead of an attached file, a text string including the address information for the file transfer server, the destination user downloads the file from the designated file transfer server 21 based on the information included in the text string.

With reference to FIGS. 2 through 7, the functions of the operation panel 40 will now be described in detail.

The operation panel 40 has a liquid crystal display screen 41, a numerical key pad 42, function switching keys comprising a copy mode key 43 and a scanner mode key 44, and a start key 45 to start copying or scanning.

Figure 2:
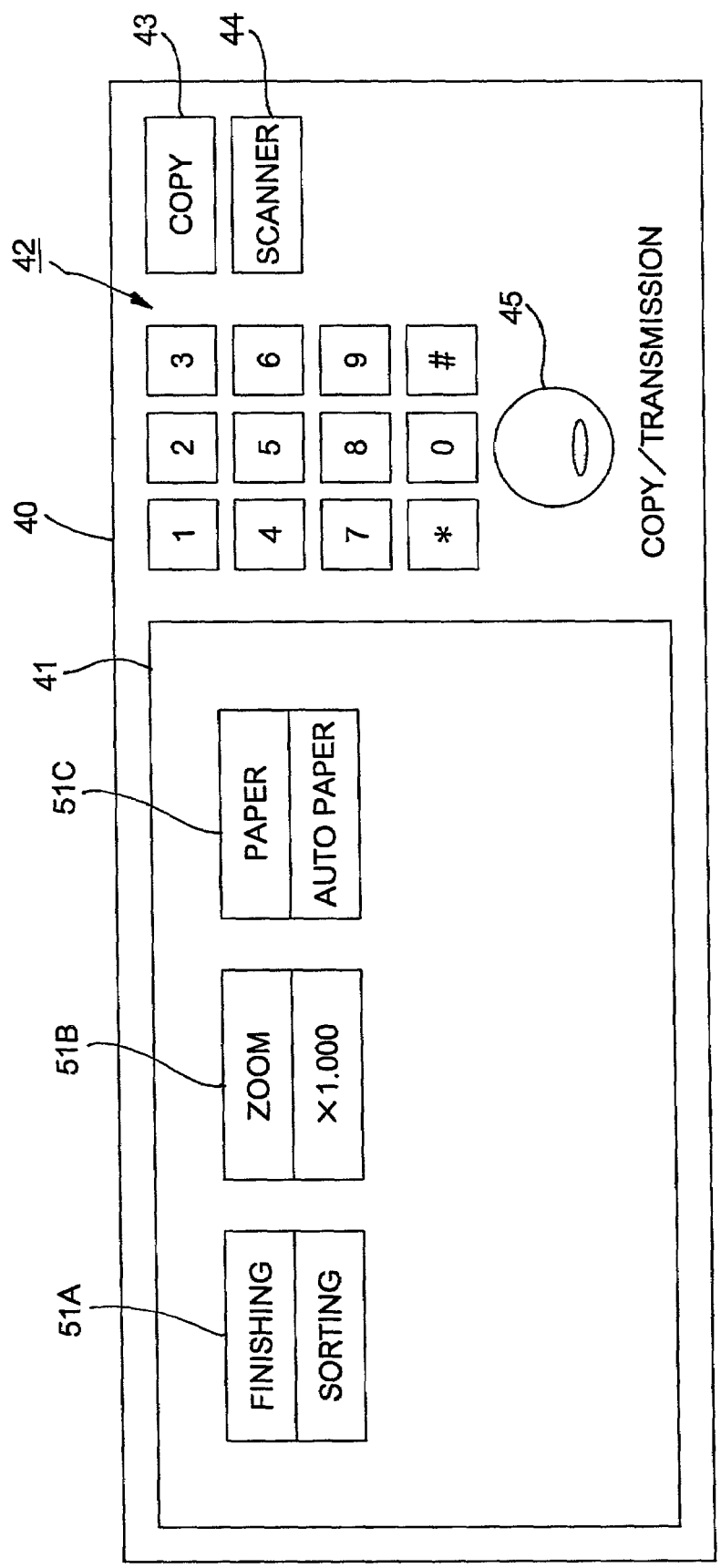
FIG. 2 is an illustration to explain the parameter setting screen in the operation panel when the copy mode of the data transmission device is activated.

The liquid crystal display screen 41 displays, as the initial screen, the parameter setting screen shown in FIG. 2. The parameter setting screen has an input field 51A in which to designate the finishing method such as sorting, an input field 51B in which to designate the copy magnification ratio, and an input field 51C in which to designate the paper size.

Figure 3:
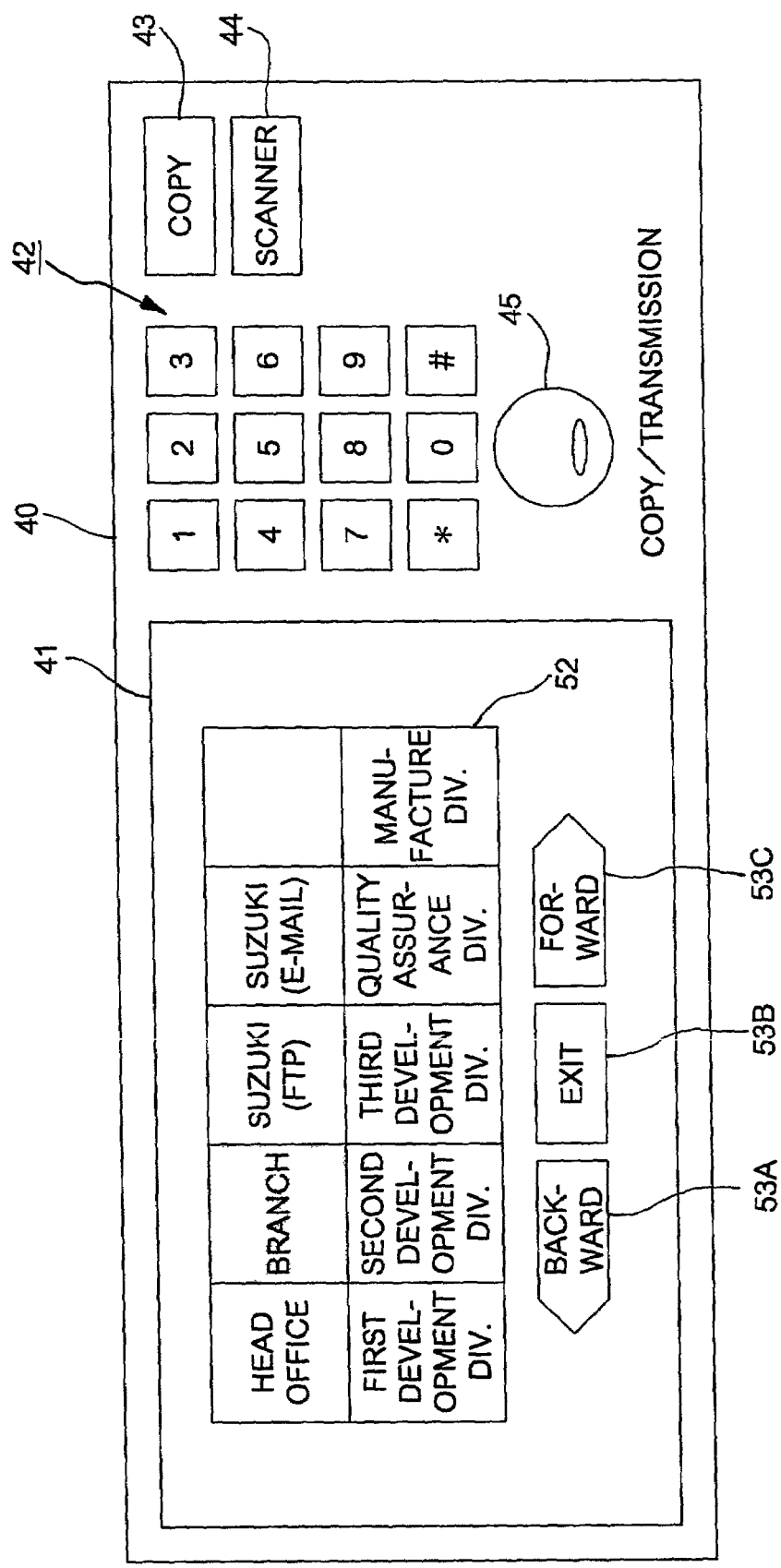
FIG. 3 is an illustration to explain the destination designating screen in the operation panel when the scanner mode of the data transmission device is activated.

When the scanner mode key 44 is pressed, the liquid crystal display screen 41 displays the destination designating screen shown in FIG. 3. The destination designating screen has an input field 52 comprising multiple keys showing a list of destinations that have already been registered, a forward key 53C and a backward key 53A that are used when the list of destinations encompasses multiple pages, and a selection finished key 53B that is used to input that the designation of destinations has been finished. The liquid crystal display screen 41 changes from the destination designating screen to the parameter setting screen shown in FIG. 2 when the copy mode key 43 is pressed.

Figure 4:
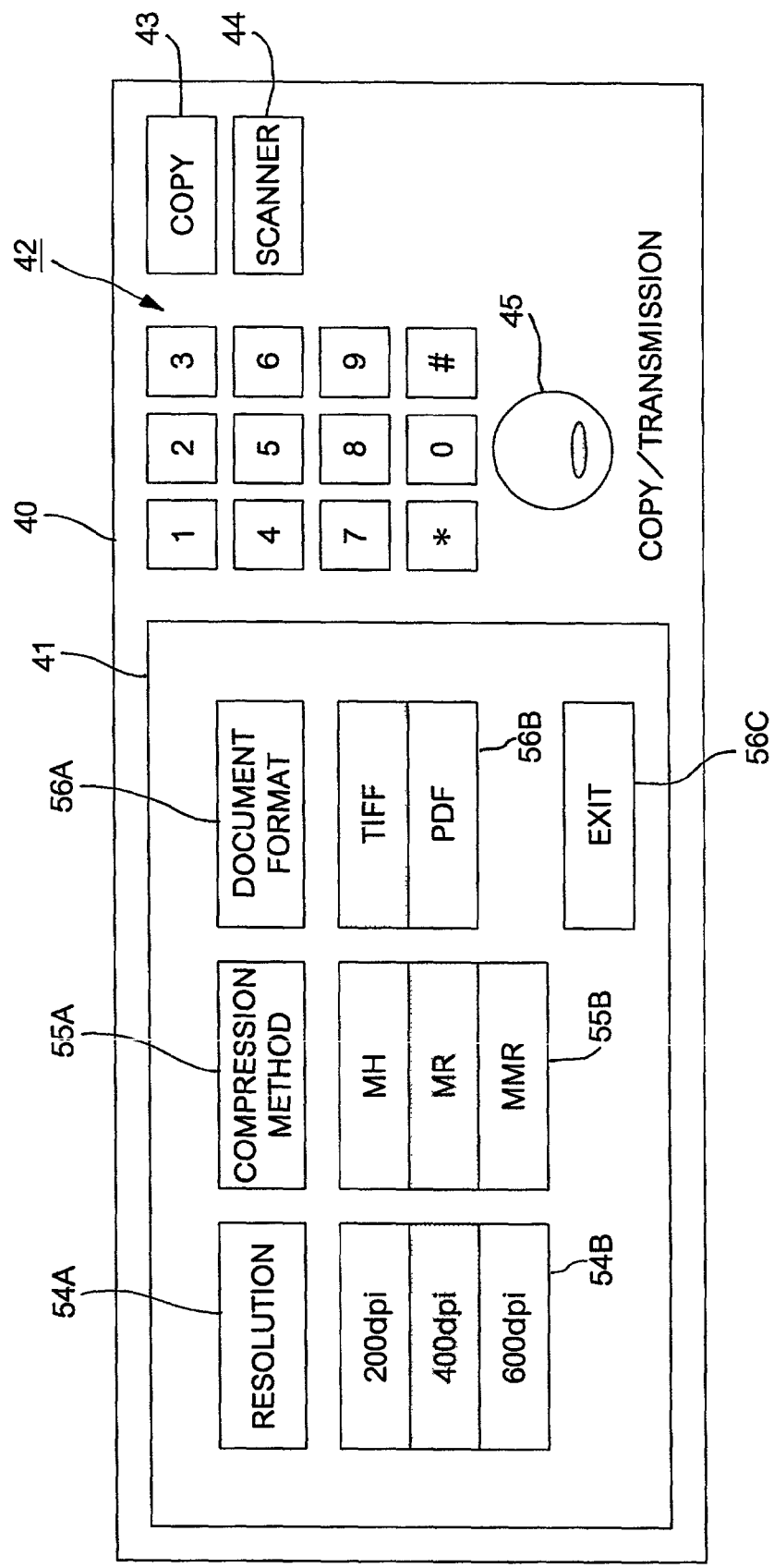
FIG. 4 is an illustration to explain the parameter setting screen when the scanner mode is activated.

When a key in the input field 52 showing the destinations, i.e., 'Branch' is touched, for example, the destination designating screen switches to the parameter setting screen shown in FIG. 4. The parameter setting screen has input fields 54A and 54B in which to designate the resolution such as 400 dpi (dots per inch), input fields 55A and 55B in which to designate the compression method such as MR, input fields 56A and 56B in which to designate the document format such as TIFF, and a setting finished key 56C to input that the parameter setting has been finished.

Figure 5:
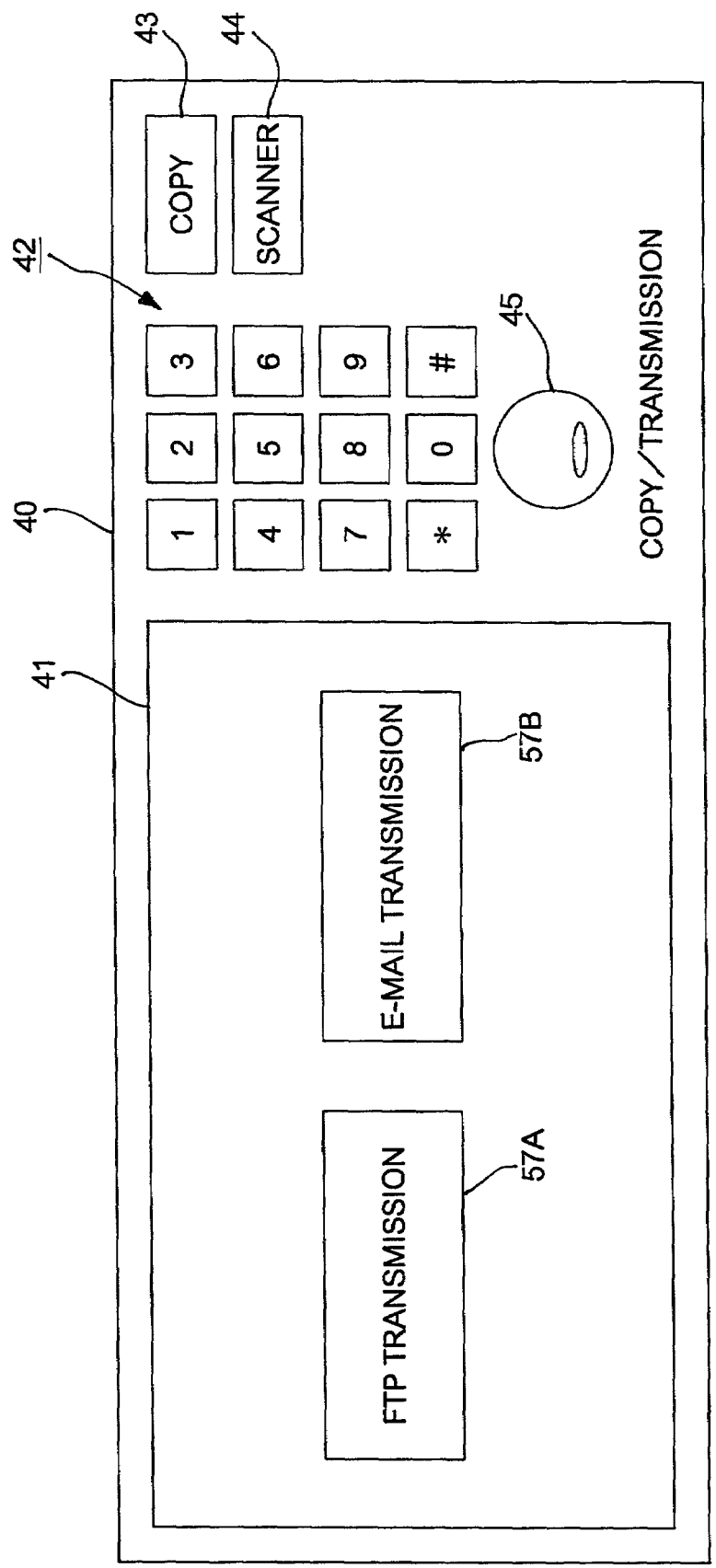
FIG. 5 is an illustration to explain the transmission method selection screen when the scanner mode is activated.

When a blank key, i.e., a key in which no destination is shown, in the display field 52 is touched, the destination designating screen switches to the transmission method selection screen shown in FIG. 5. The transmission method selection screen has an input field 57A in which to designate FTP transmission (the second transmission mode), and an input field 57B in which to designate e-mail transmission (the first transmission mode).

Figure 6:
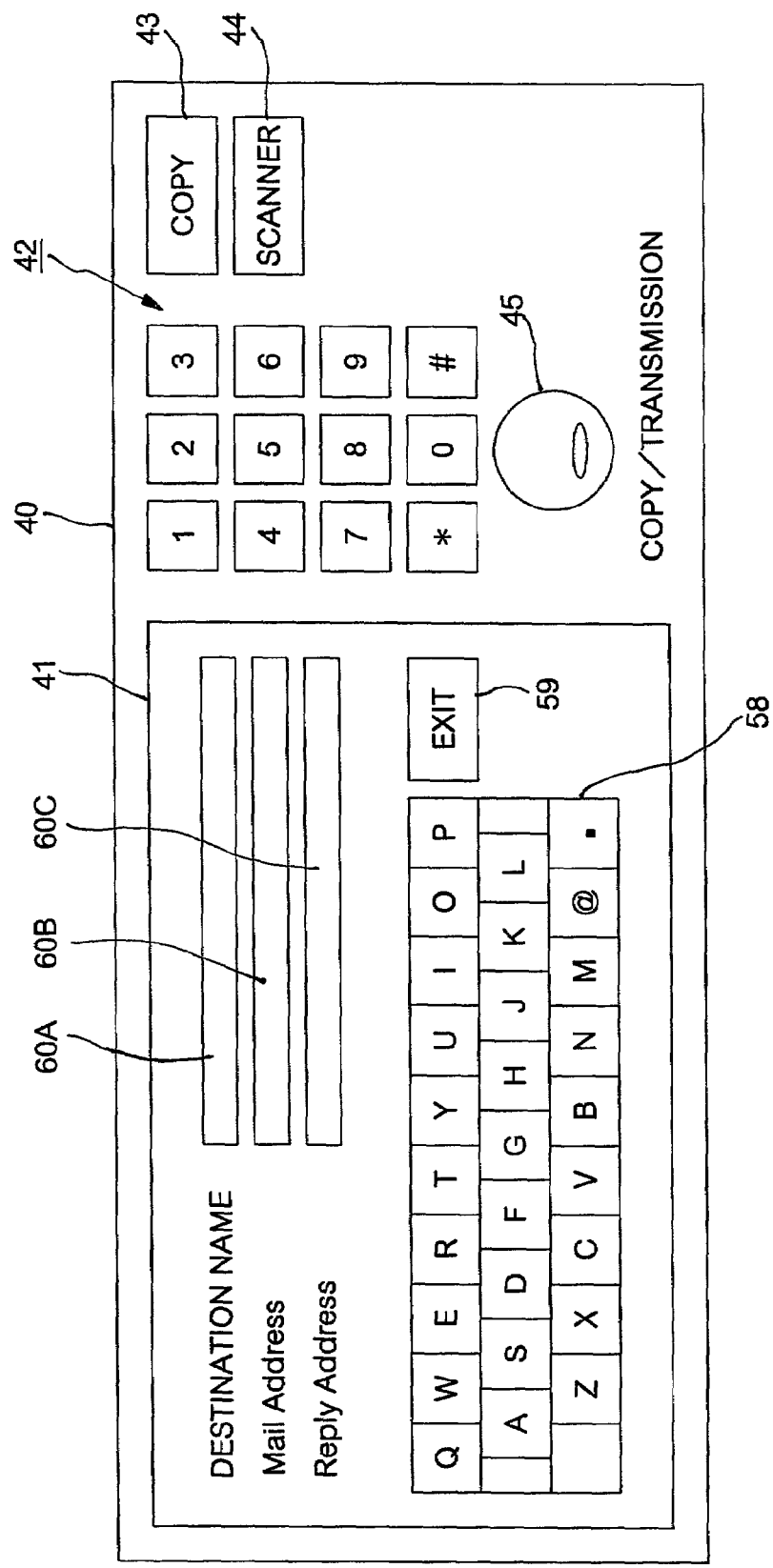
FIG. 6 is an illustration to explain the e-mail registration screen when the scanner mode is activated.

The transmission method selection screen switches to the e-mail registration screen shown in FIG. 6 when the input field 57B is touched. The e-mail registration screen has an input field 60A in which to input the destination name, an input field 60B in which to input the destination mail address, an input field 60C in which to input the reply mail address (the mail address of the sending user, for example), a keyboard 58 by which to input letters, and a finish key 59 to instruct completion of the registration routine.

Figure 7:
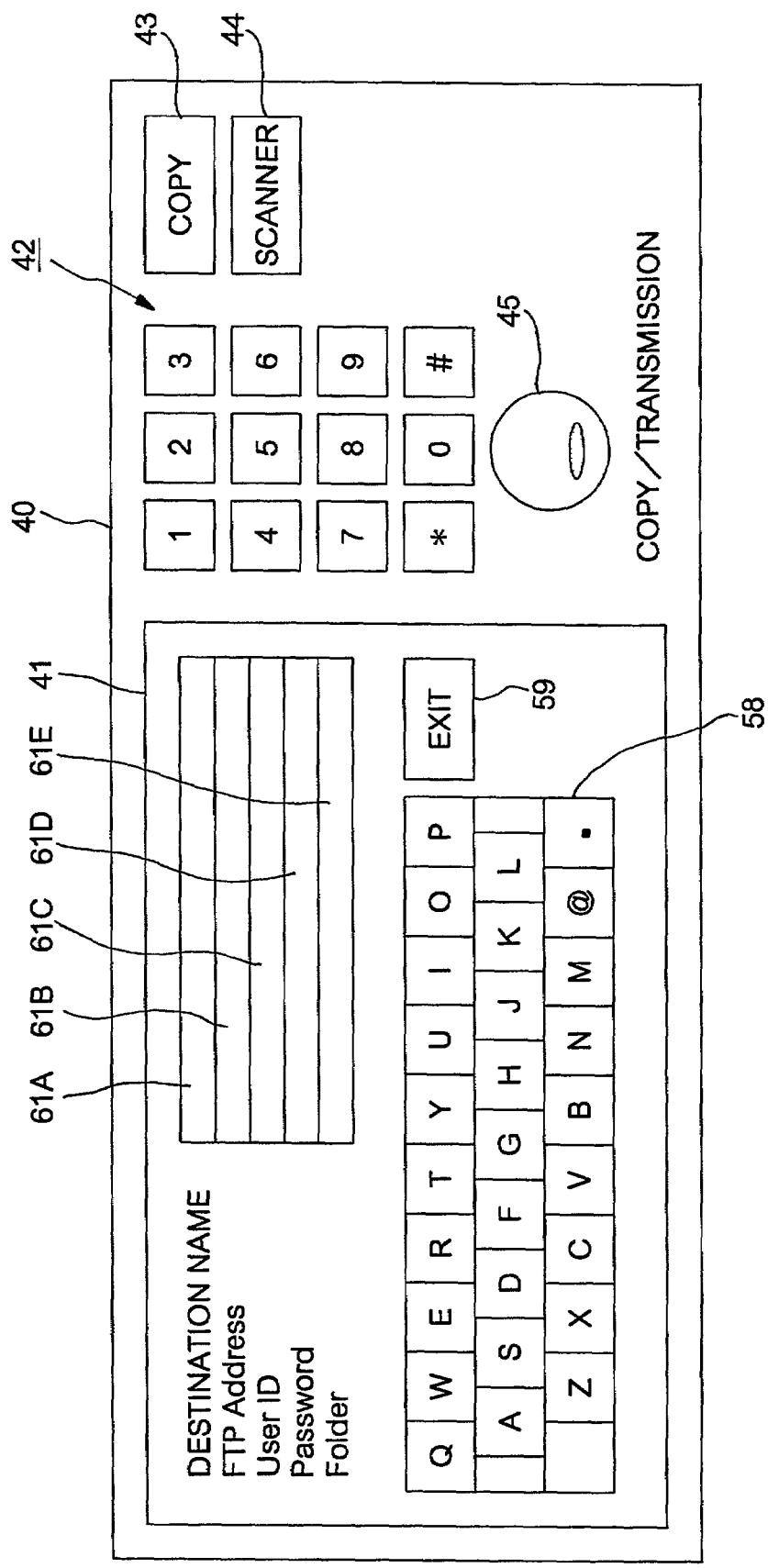
FIG. 7 is an illustration to explain the FTP registration screen when the scanner mode is activated.

The transmission method selection screen switches to the FTP registration screen shown in FIG. 7 when the input field 57A is touched. The FTP registration screen has an input field 61A in which to input the destination name, an input field 61B in which to input the FTP address (the IP address of the file transfer server 21, which is the sender of the file), input fields 61C and 61D in which to input the user ID and password to use the access authority authentication function of the file transfer server 21, an input field 61E in which to input the name of the folder to store the file, a keyboard 58 and a finish key 59. The file name is automatically determined, but the construction of the device may be made such that the file name can be designated via manual input.

Figure 8:
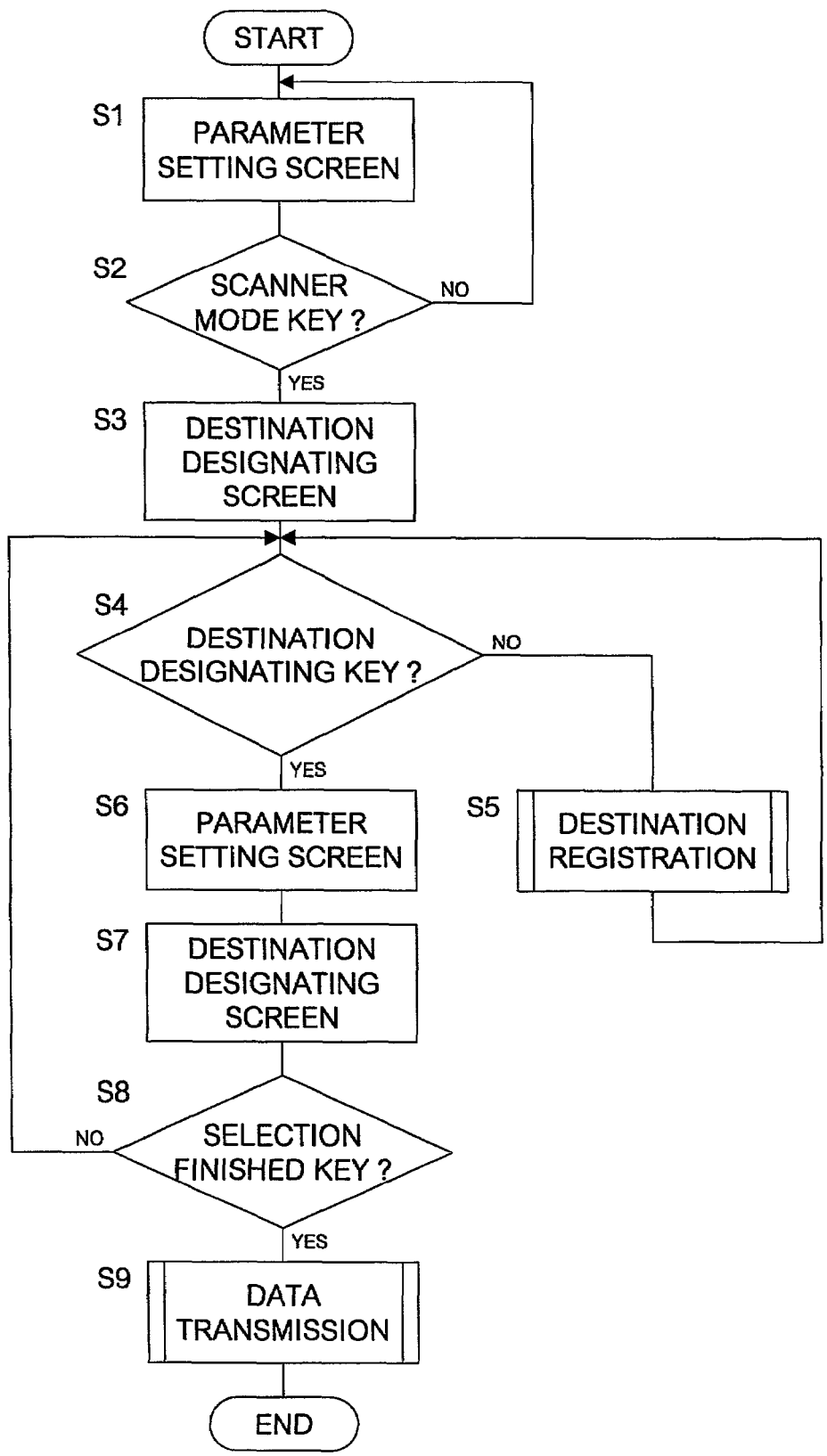
FIG. 8 is a flow chart to explain the outline of the operation of the data transmission device.

The basic operation of the data transmission device will now be described with reference to FIG. 8.

When booted, the data transmission device 10 displays the parameter setting screen (FIG. 2) in the copy mode as the initial screen (step S1). The original document that the user of the data transmission device, i.e., the sending user, wishes to send as an image file is then placed on the ADF of the image reading unit by the user.

It is then determined whether or not the scanner mode key 44 has been pressed (step S2). Where it is determined that the scanner mode key 44 has not been pressed, the parameter setting screen in the copy mode continues to be displayed, prompting the sending user to input reproduction parameters.

Where it is determined that the scanner mode key 44 has been pressed, on the other hand, the destination designating screen (FIG. 3) in the scanner mode is displayed (step S3). It is then determined whether or not any key (destination designating key) of the input field 52 in the destination designating screen has been touched (step S4).

Where it is determined that a blank key, i.e., a key in which no destination is shown, has been touched, the destination registration routine is carried out (step S5). When this routine is finished, the device returns to step S4.

Where it is determined that a key in which a destination is shown has been touched, on the other hand, the parameter setting screen (FIG. 4) is displayed (step S6). When parameter values are set and the setting finished key 56C is touched, the destination designating screen (FIG. 3) is displayed (step S7).

It is then determined whether or not the selection finished key 53B in the destination designating screen has been touched (step S8). Where it is determined that the selection finished key 53B has been touched, scanning of the original document is begun when the start key 45 is pressed, and data that includes the thus-obtained image file is sent. In other words, the data transmission routine is carried out (step S9). On the other hand, where it is determined that the selection finished key 53B has not been touched and that a destination designating key of the input field 52 has been touched, the device returns to step S4.

Figure 9:
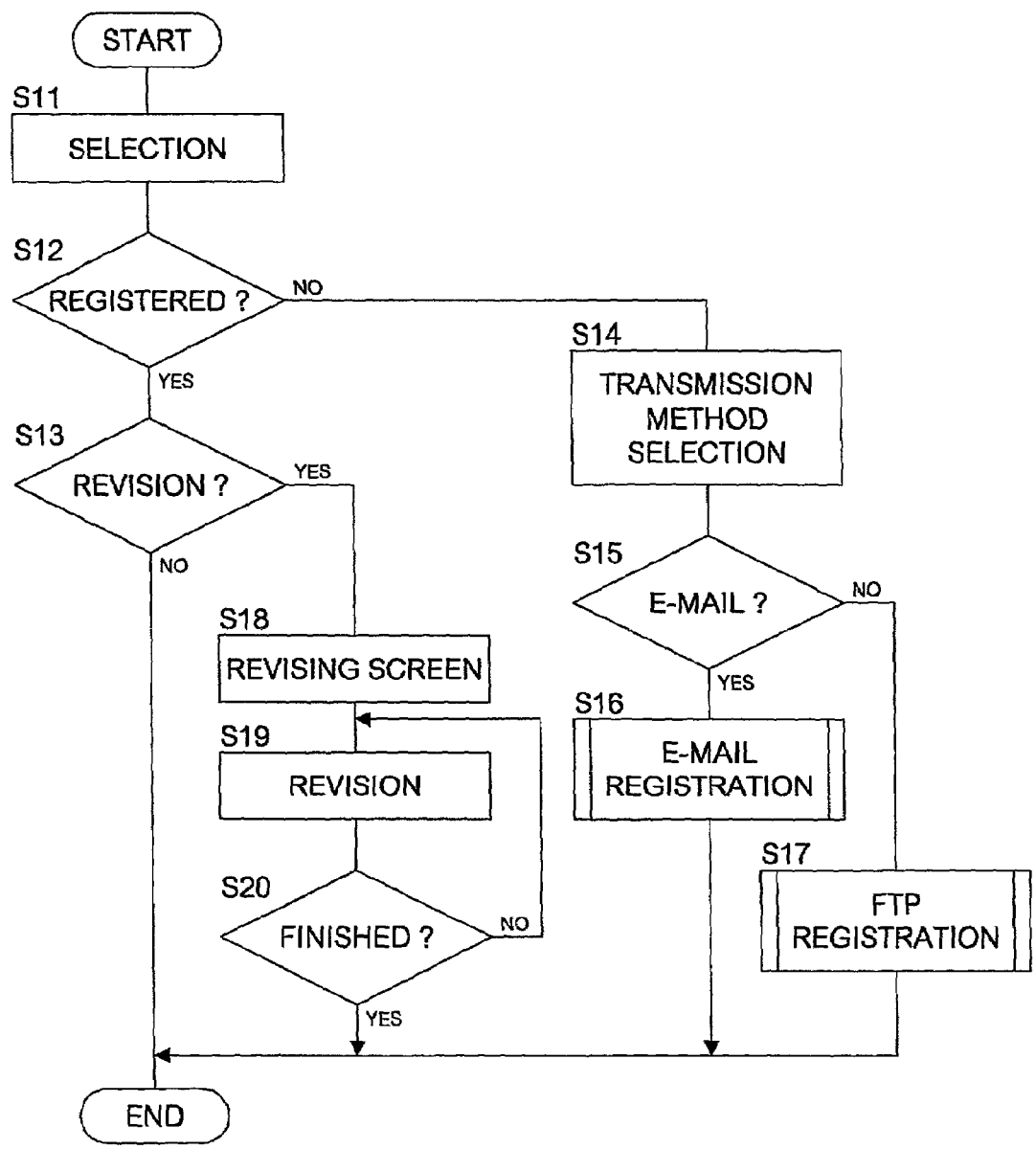
FIG. 9 is a flow chart to explain the destination registration routine of step S5 in FIG. 8.

The destination registration routine of step S5 will now be described with reference to FIG. 9.

In the input field 52 of the destination designating screen, a destination key the setting for which is wished to be changed or a blank key for which a destination is wished to be newly set is touched or selected (step S11). It is thereafter determined whether or not registration has already been made for the selected key (step S12).

Where it is determined that registration has already been made for the selected key, it is further determined whether or not there is a request for revision (step S13).

Where it is determined that there is a request for revision, a revising screen in accordance with the registration contents is displayed (step S18). The revising screen is the same as the e-mail registration screen shown in FIG. 6 or the FTP registration screen shown in FIG. 7, but it differs from them in that the registration contents are displayed. Desired revisions are then made to the registration contents (steps S19 and S20).

Where it is determined that no registration has yet been made for the selected key, on the other hand, the transmission method selection screen (FIG. 5) is displayed (step S14). It is then determined whether or not the input field 57B in which to designate e-mail transmission has been touched (step S15). Where it is determined that e-mail transmission has been designated, the e-mail registration routine is carried out (step S16). Where it is determined that FTP transmission has been designated, the FTP registration routine is carried out (step S17).

Figure 10:
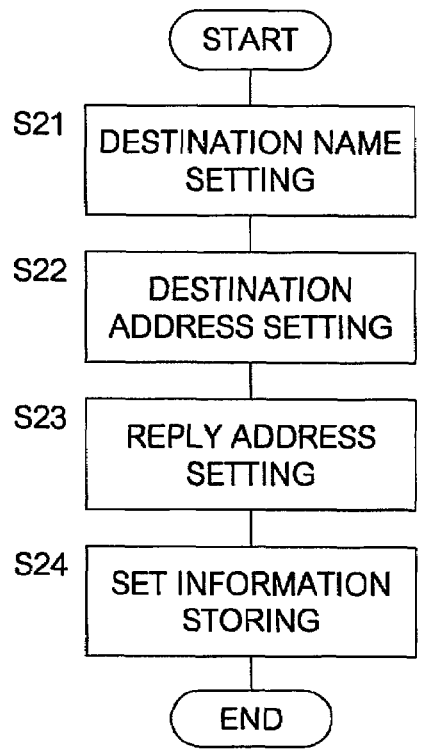
FIG. 10 is a flow chart to explain the e-mail registration routine of step S16 in FIG. 9.

The e-mail registration routine of step S16 will now be described with reference to FIG. 10.

The destination name is first set via the character string input in the input field 60A (step S21). The destination mail address is then set via the character string input in the input field 60B (step S22). The reply mail address is then set via the character string input in the input field 60C (step S23). When the finish key 59 is touched thereafter, the e-mail registration information thus set is stored in the memory device 12 (step S24).

Figure 11:
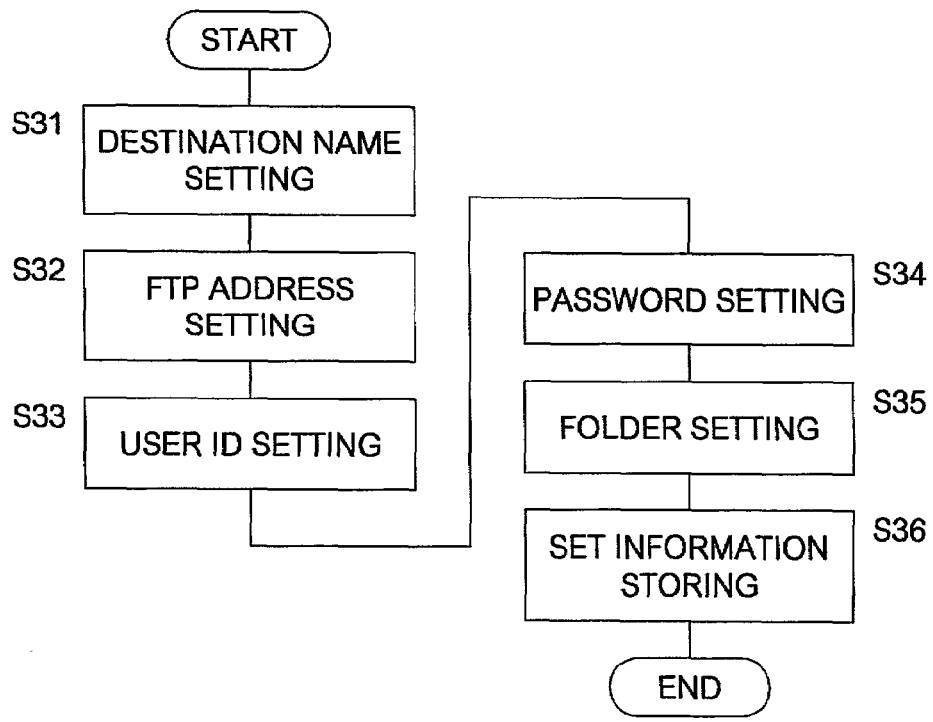
FIG. 11 is a flow chart to explain the FTP registration routine of step S17 in FIG. 9.

The FTP registration routine of step S17 will now be described with reference to FIG. 11.

The destination name is first set via the character string input in the input field 61A (step S31). The FTP address is then set via the character string input in the input field 61B (step S32). The user ID is then set via the character string input in the input field 61C (step S33). The password is then set via the character string input in the input field 61D (step S34). The folder name is then set via the character string input in the input field 61E (step S35). When the finish key 59 is touched thereafter, the FTP registration information thus set is stored in the memory device 12 (step S36).

Figure 12:
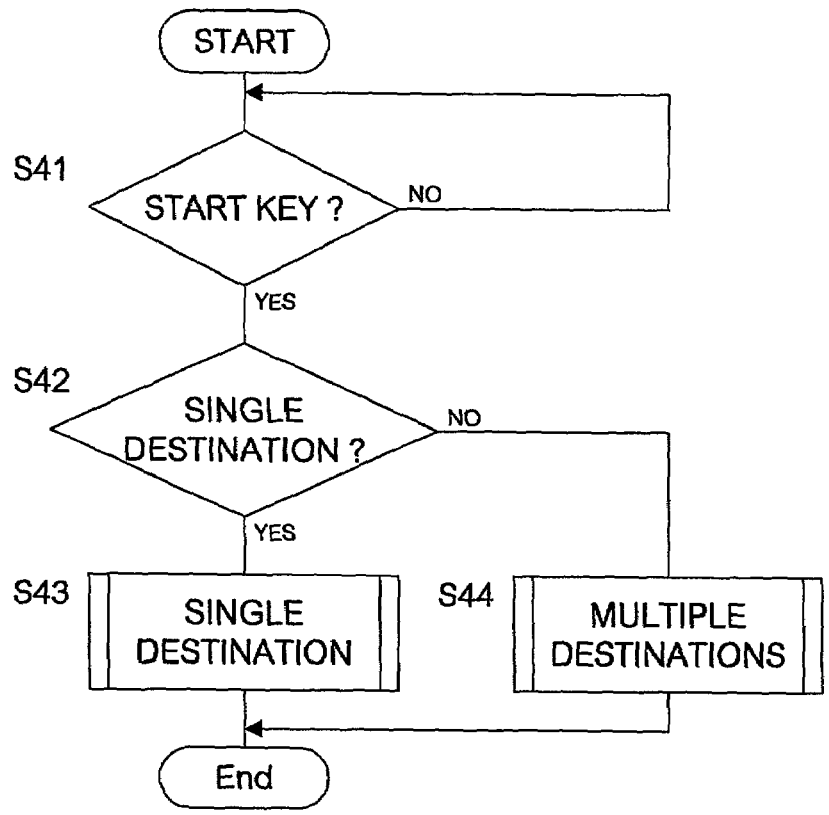
FIG. 12 is a flow chart to explain the data transmission routine of step S9 in FIG. 8.

The data transmission routine of step S9 of FIG. 8 will now be described with reference to FIG. 12.

It is first determined whether or not the start key 45 of the operation panel 40 has been pressed (step S41). Where it is determined that the start key 45 has been pressed, it is determined whether or not only a single destination has been selected (step S42).

Where it is determined that only a single destination has been selected, the single destination routine is carried out (step S43). Where it is determined that multiple destinations have been selected, i.e., that the transmission is multi-destination delivery transmission, the multiple destination routine is carried out (step S44).

Figure 13:
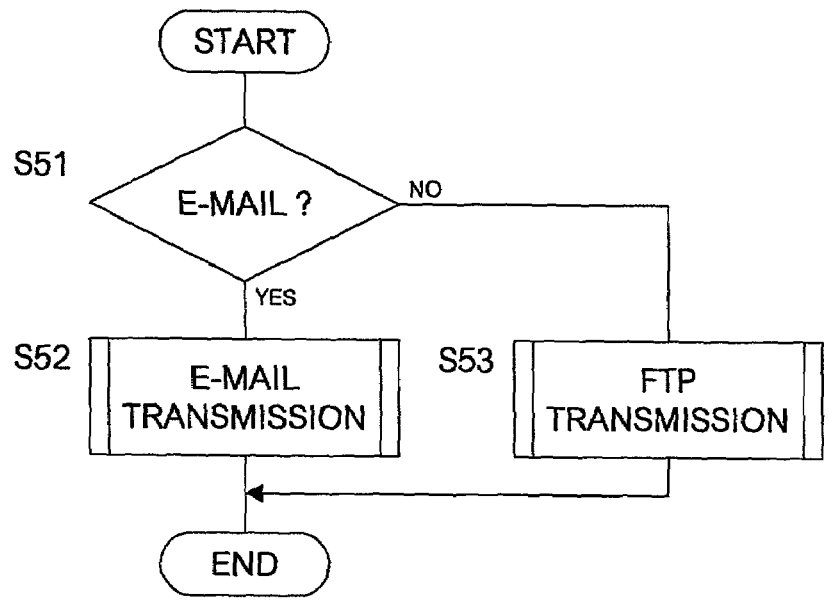
FIG. 13 is a flow chart to explain the single destination routine of step S43 in FIG. 12.

The single destination routine of step S43 will now be described with reference to FIG. 13.

The information pertaining to the designated destination is first read from the destination registration file, and based on this information, it is determined whether or not the transmission method should be e-mail (step S51).

Where the transmission method is determined to be e-mail, the e-mail transmission routine is carried out (step S52). Where it is determined that the transmission method is not e-mail, on the other hand, the FTP transmission routine is carried out (step S52).

Figure 14:
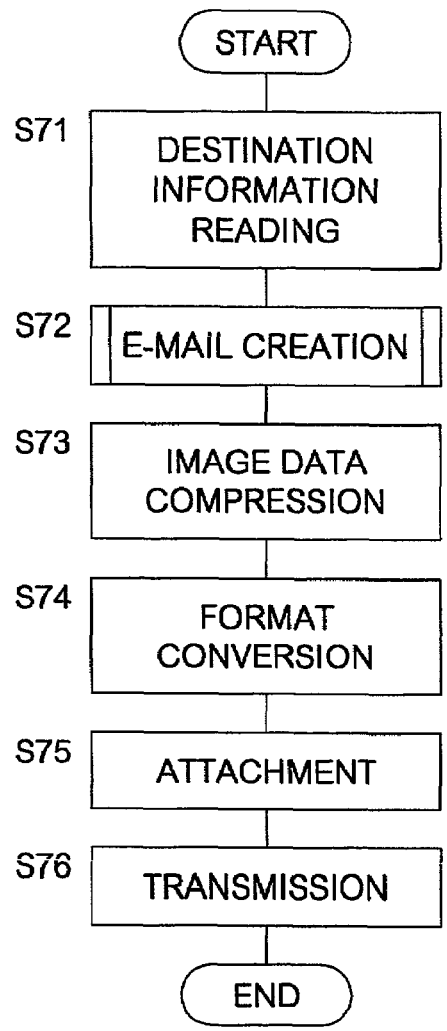
FIG. 14 is a flow chart to explain the e-mail transmission routine of step S52 in FIG. 13.

The e-mail transmission routine of step S52 will now be described with reference to FIG. 14.

Figure 15:
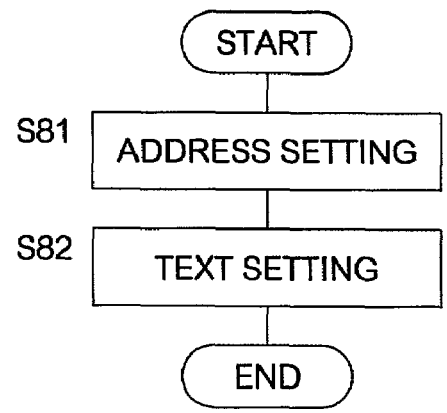
FIG. 15 is a flow chart to explain the e-mail creation routine of step S72 in FIG. 14.

The e-mail information for the designated destination is read from the destination registration file (step S71), and the e-mail creation routine is carried out (step S72). The e-mail creation routine comprises the setting of the destination mail address (step S81) and the setting of a text string (step S82), as shown in FIG. 15. The text string comprises a message such as 'An image file is attached', for example.

The image data to be attached to the e-mail is then compressed (step S73), and is converted into a file having the designated format (step S74). The file is attached to the e-mail (step S75), which is then sent to the mail server 22 (step S76).

Figure 16:
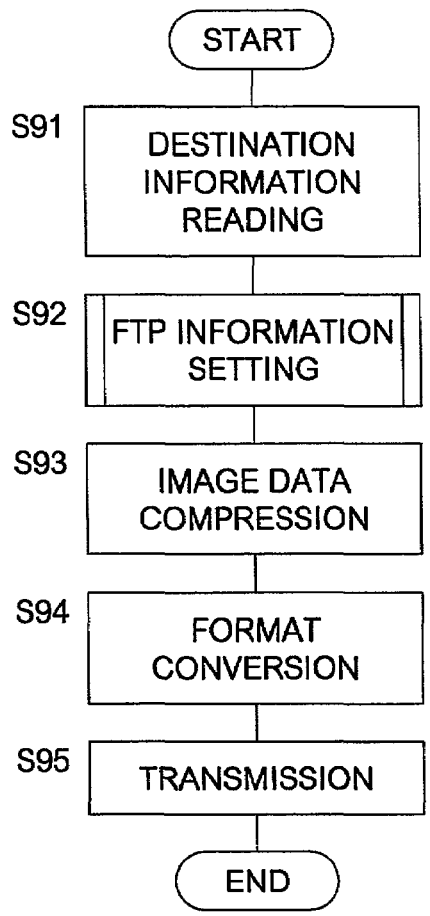
FIG. 16 is a flow chart to explain the FTP transmission routine of step S53 in FIG. 13.

The FTP transmission routine of step S53 will now be described with reference to FIG. 16.

Figure 17:
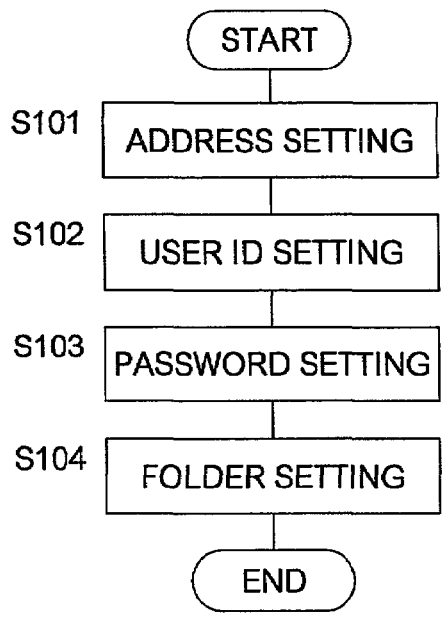
FIG. 17 is a flow chart to explain the FTP information setting routine of step S92 in FIG. 16.

The FTP information for the designated destination is first read from the destination registration file (step S91), and the FTP information setting routine is carried out (step S92). The FTP information setting routine comprises the setting of an FTP address (step S101), the setting of a user ID (step S102), the setting of a password (step S103) and the setting of a folder (step S104), as shown in FIG. 17.

The image data to be sent to the file transfer server 21 is then compressed (step S93), and is converted into a file having the designated format (step S94). The file is then transmitted to the file transfer server 21 based on the FTP information (step S95).

Figure 18:
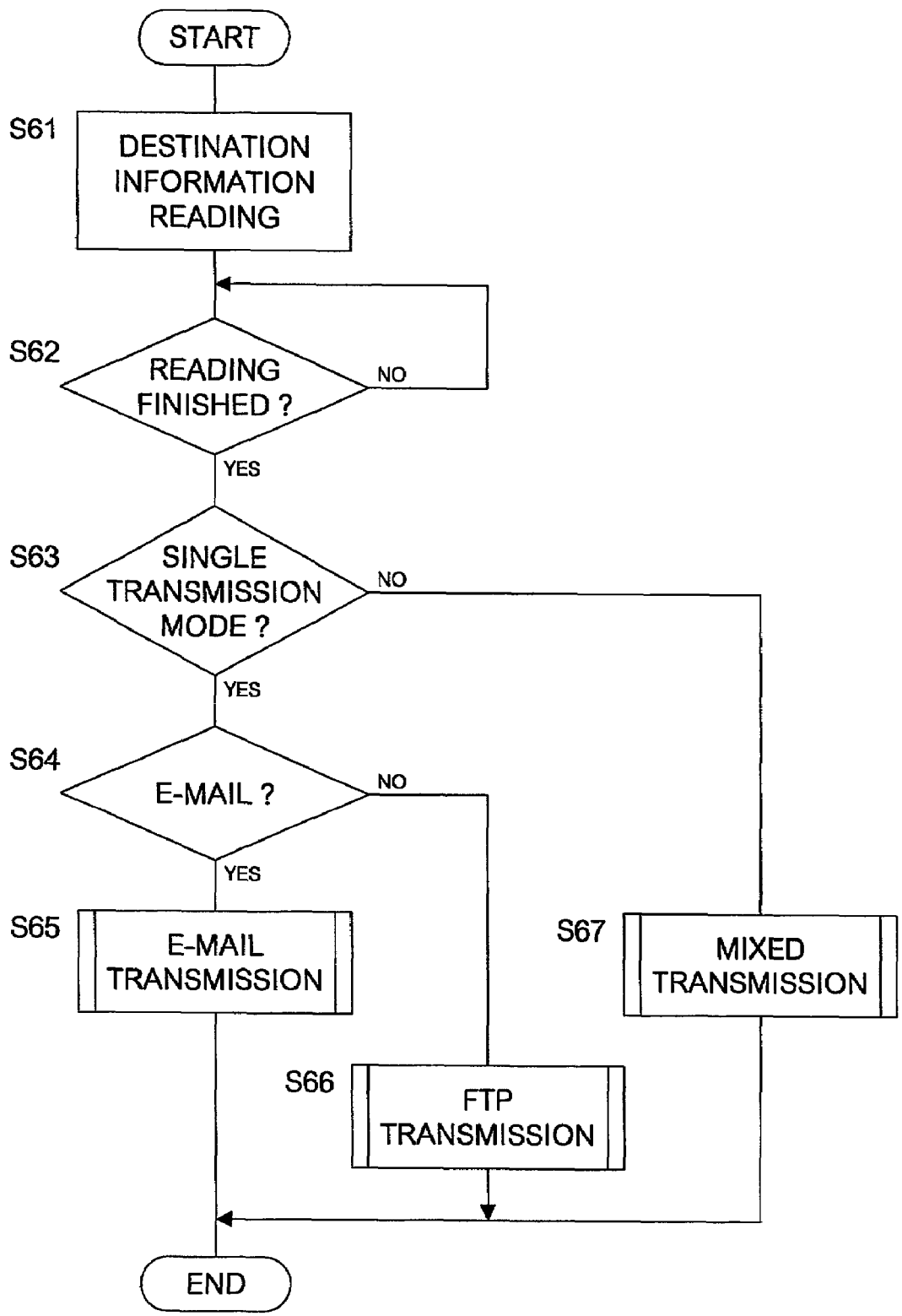
FIG. 18 is a flow chart to explain the multiple destination routine of step S44 in FIG. 12.

The multiple destination (multi-destination delivery) routine of step S44 of FIG. 12 will now be described with reference to FIG. 18.

The information for the designated multiple destinations is first read from the destination registration file (steps S61 and S62). It is then determined whether or not a single transmission mode is designated (step S63). Designation of a single transmission mode means that the transmission method for all of the multiple destinations is either e-mail transmission (the first transmission mode) or FTP transmission (the second transmission mode).

Where it is determined that a single transmission mode is designated, it is further determined whether or not the transmission method is e-mail (step S64). Where it is determined that the transmission method is e-mail, the e-mail transmission routine (see FIGS. 14 and 15) is carried out (step S65), and where it is determined that the transmission method is not e-mail, the FTP transmission routine (see FIGS. 16 and 17) is carried out (step S66).

Where it is determined that multiple transmission modes are designated, the routine for mixed transmission (the third transmission mode) is carried out with regard to the destinations for which the first transmission mode is designated (step S67).

Figure 19:
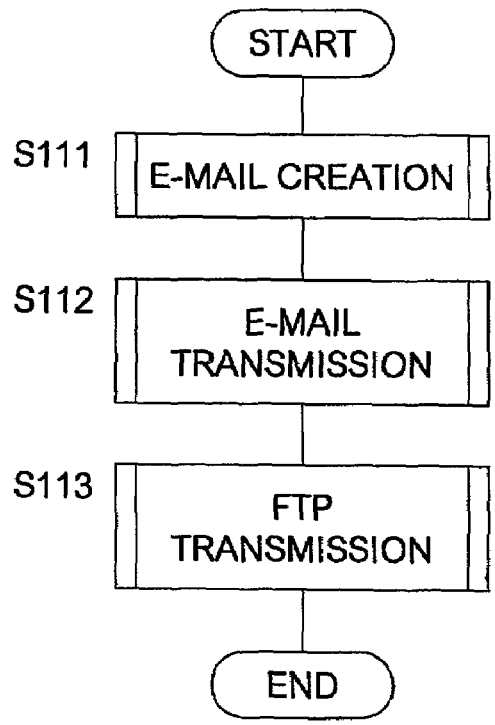
FIG. 19 is a flow chart to explain the mixed transmission routine of step 67 in FIG. 18.

The mixed transmission routine of step S67 will now be described with reference to FIG. 19.

Figure 20:
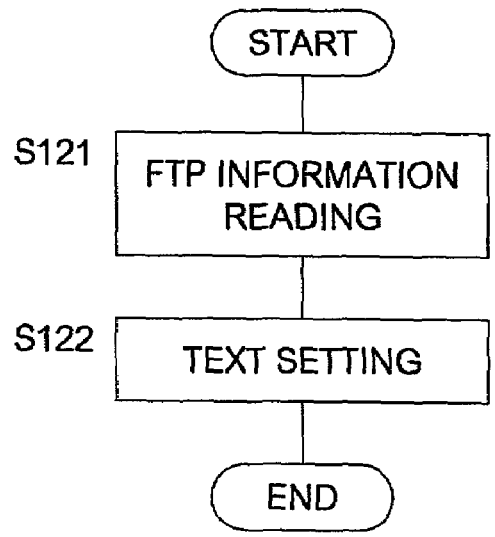
FIG. 20 is a flow chart to explain the e-mail creation routine of step S111 in FIG. 19.

The e-mail creation routine is first carried out (step S111). The e-mail creation routine comprises the reading of the FTP information (step S121) and the setting of a text string (step S122), as shown in FIG. 20.

Reading of the FTP information means reading of the FTP information for the designated destination from the destination registration file and extraction of the FTP address (the file transfer server address information), user ID, password and folder name.

Setting of a text string means to create a text string to which the extracted information is added. For example, the text string includes, in addition to the message 'The image file was sent to the following FTP server', the FTP address, user ID, password and folder name. The file name may also be included in the text string.

Figure 21:
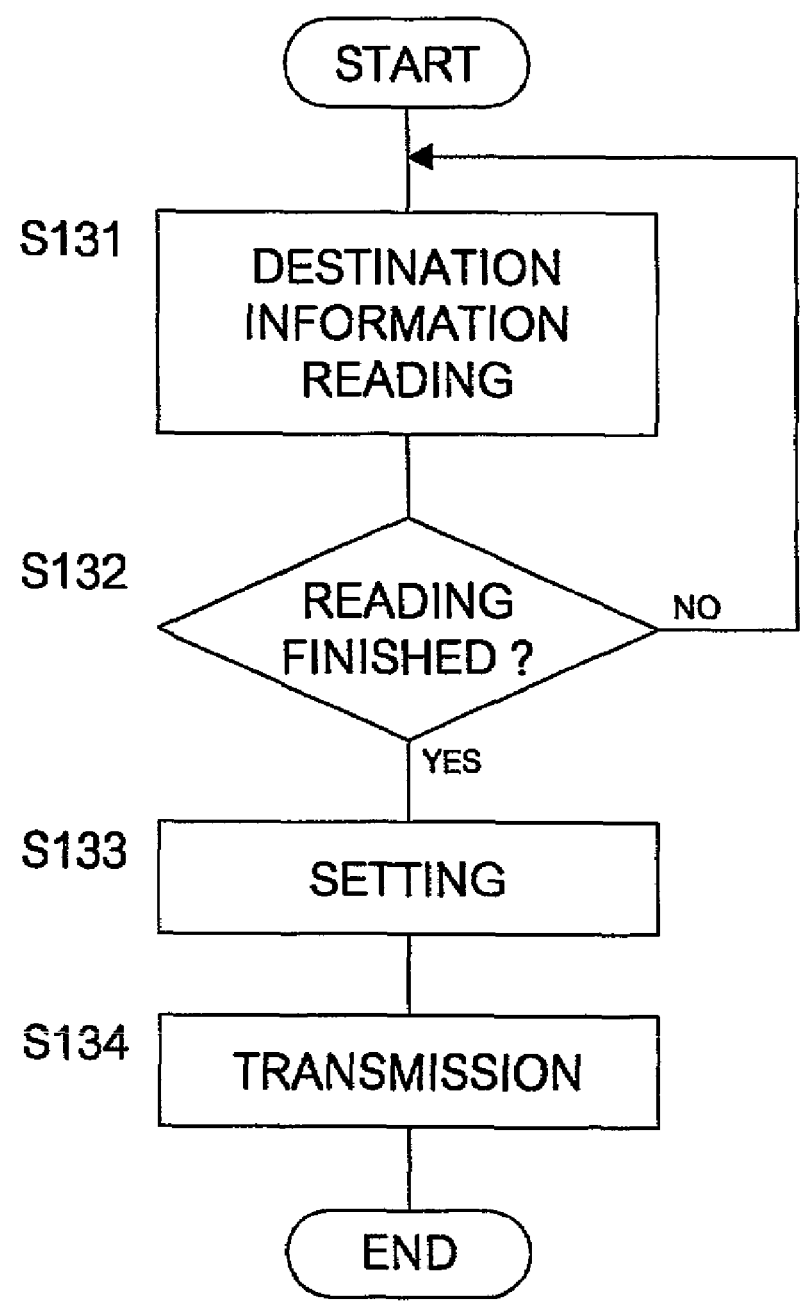
FIG. 21 is a flow chart to explain the e-mail transmission routine of step S112 in FIG. 19.

The e-mail transmission routine is then carried out (step S112). In the e-mail transmission routine, as shown in FIG. 21, the e-mail information for the designated multiple destinations is first read from the destination registration files (steps S131 and S132). Parameter values for the e-mail are set based on the thus-read information (step S133). The e-mail message having the text to which the file transfer server address information is added is then sent to the mail server 22.

The FTP transmission routine (see FIGS. 16 and 17) is then carried out (step S113).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

In the above embodiment, descriptions were provided with regard to a digital copying machine, but the present invention may be applied, for example, to an image scanner, facsimile machine or computer having a network function. The present invention may also be applied to a system comprising a computer having a network function and an image scanner connected thereto using an interface such as SCSI (Small Computer System Interface) or USB (Universal Serial Bus).

Furthermore, the data transmission program may be provided as application software that causes the computer to function as a data transmission device, or integrated in a facsimile machine or scanner as part of the functions thereof. The program may also be provided via a computer-readable recording medium such as a flexible disk or a CD-ROM.

The file attached to an e-mail message may comprise image data that is generated using graphics software.

As described above, using the present invention, the transmission method is unified in multi-destination delivery, making the control easier and reducing the data processing time. In addition, because a file is not attached to the e-mail message, the network occupation rate and the burden on the mail server may be reduced. In other words, because the data processing time and the network occupation rate may be reduced, work efficiency in data transmission may be improved.

What is claimed is:

1. A data transmission device comprising:
    transmitting means having a first transmission mode in which a file is sent attached to an e-mail message, a second transmission mode in which a file is sent to a file transfer server, and a mixed transmission mode in which a file is sent to a file transfer server and an e-mail message having a text string including address information of the file transfer server is sent; and
    transmission judging means for determining whether or not the destinations include those for which the first transmission mode as well as those for which the second transmission mode are designated during multi-destination delivery in which multiple destinations are designated, wherein
    when the transmission judging means judges that the destinations for the first and second transmission modes are included, the transmitting unit executes the mixed transmission mode in which an e-mail message having a text string including address information of the file transfer server designated in the second mode is sent to the destination designated for the first mode, where no file is attached to the e-mail, and
    a file designated for the second mode is sent to the file transfer server.

2. A data transmission device according to claim 1, further comprising data generating means for generating image data, and
    wherein the file to be sent comprises the image data generated by the data generating means.

3. A data transmission device according to claim 1, further comprising an image reader for reading an image of an original document and outputting image data, and
    wherein the file to be sent comprises the image data output by the image reader.

4. A data transmission device according to claim 1, wherein the file transfer server is an FTP server, and the address information includes an IP address of the FTP server and a name of the folder in which the file is to be stored.

5. A data transmission device according to claim 1, wherein the file transfer server has an access authority authentication function and the text string of the e-mail message in the third transmission mode includes a user ID and password for authentication purposes.

6. A method for use with a data transmission device, comprising:
    receiving an instruction to designate for each destination one of a first transmission mode in which a file is sent attached to an e-mail message, a second transmission mode in which a file is sent to a file transfer server and a mixed transmission mode in which a file is sent to a file transfer server and an e-mail message having a text string including address information of the file transfer server is sent;
    determining during multiple-destination delivery in which multiple destinations are designated whether or not the destinations include those for which the first transmission mode is designated as well as those for which the second transmission mode is designated; and
    executing the mixed transmission mode when the destinations for the first and second transmission modes are included, wherein an e-mail message having a text string including address information of the file transfer server designated for the second mode is sent to the destination designated for the first mode, where no file is attached to the e-mail and a file designated in the second mode is sent to the file transfer server.

7. A method according to claim 6, wherein the file transfer server is an FTP server, and the address information includes an IP address of the FTP server and a name of the folder in which the file is to be stored.

8. A method according to claim 6, wherein the file transfer server has an access authority authentication function and the text string of the e-mail message in the third transmission mode includes an user ID and password for authentication purposes.

9. A program product stored on a computer readable medium for a mail server, said program product including instructions to execute the following steps:
    receiving an instruction to designate for each destination one of a first transmission mode in which a file is sent attached to an e-mail message, a second transmission mode in which a file is sent to a file transfer server and a thifd mixed transmission mode in which a file is sent to a file transfer server and an e-mail message having a text string including address information of the file transfer server is sent;
    determining during multiple-destination delivery in which multiple destinations are designated whether or not the destinations include those for which the first transmission mode is designated as well as those for which the second transmission mode is designated; and
    executing the mixed transmission mode when the destinations for the first and second transmission modes are included, wherein an e-mail message having a text string including address information of the file transfer server designated for the second mode is sent to the destination designated for the first mode, where no file is attached to the e-mail and a file designated in the second mode is sent to the file transfer server.

10. The program product of claim 9, wherein the file transfer server is an FTP server, and the address information includes an IP address of the FTP server and a name of the folder in which the file is to be stored.

11. The program product of claim 9, wherein the file transfer server has an access authority authentication function and the text string of the e-mail message in the third transmission mode includes an user ID and password for authentication purposes.

* * * * *

UNITED STATES PATENT AND TRADEMARK OFFICE
CERTIFICATE OF CORRECTION

| | | |
|---|---|---|
| PATENT NO. | : 7,647,377 B2 | Page 1 of 1 |
| APPLICATION NO. | : 10/073150 | |
| DATED | : January 12, 2010 | |
| INVENTOR(S) | : Yasushi Yamade | |

It is certified that error appears in the above-identified patent and that said Letters Patent is hereby corrected as shown below:

In the Claims:

Column 10, in claim 9, line 51, please remove the word "thifd".

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,647,377 B2  Page 1 of 1
APPLICATION NO. : 10/073150
DATED : January 12, 2010
INVENTOR(S) : Yasushi Yamade It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2025 days.

Signed and Sealed this

Sixteenth Day of November, 2010

David J. Kappos
*Director of the United States Patent and Trademark Office*